United States Patent [19]
Herzog et al.

[11] Patent Number: 4,568,727
[45] Date of Patent: Feb. 4, 1986

[54] STORAGE STABLE, HEAT CURABLE MIXTURES OF EPOXY RESINS AND METHOD FOR PREPARING SAME

[75] Inventors: Rolf Herzog, Bottrop; Dietrich Tichy, Ihmert; Harald Heerdegen, Hagen; Rolf Kraas, Iserlohn; Ulrich Grundke, Duisburg, all of Fed. Rep. of Germany

[73] Assignee: Rutgerswerke Aktiengesellschaft, Frankfurt, Fed. Rep. of Germany

[21] Appl. No.: 710,878

[22] Filed: Mar. 12, 1985

[30] Foreign Application Priority Data

Mar. 15, 1984 [DE] Fed. Rep. of Germany ....... 3409499

[51] Int. Cl.$^4$ .............................................. C08G 59/58
[52] U.S. Cl. ...................................... 525/481; 525/523; 525/533; 525/485; 525/486; 528/113; 528/124; 528/92; 528/93; 528/94
[58] Field of Search ............... 525/481, 523, 533, 485, 525/486; 528/113, 124, 92, 93, 94

[56] References Cited

U.S. PATENT DOCUMENTS

| | | | |
|---|---|---|---|
| 2,773,048 | 12/1956 | Formo et al. | 523/400 X |
| 3,409,591 | 11/1968 | Landua et al. | 528/124 X |
| 3,714,120 | 1/1973 | Labana et al. | 528/124 X |
| 4,269,751 | 5/1981 | Firth | 528/124 X |
| 4,360,456 | 11/1982 | Firth | 525/523 X |

Primary Examiner—Earl Nielsen
Attorney, Agent, or Firm—Beveridge, DeGrandi & Weilacher

[57] ABSTRACT

Storage stable, heat curable mixtures obtained from epoxy resins as a binder system containing latent hardening agents as well as fillers and additive materials which have outstanding mechanical and electrical properties and which are obtained as epoxy resin components of an adduct of a high molecular solid epoxy resin and 4,4'-diaminodiarylalkane in a molecular ratio of 1:0.01 to 0.05. The preferred economical curing agent is a phenol formaldehyde condensation product.

18 Claims, No Drawings

STORAGE STABLE, HEAT CURABLE MIXTURES OF EPOXY RESINS AND METHOD FOR PREPARING SAME

The invention pertains to valuable mixtures containing a binder based on epoxy resins which ae storage stable at room temperature for many months and which are hardenable in a short period of time when subjected to heating conditions. Materials that are known in the art have been used as plastic forming masses or molding preparations and articles produced from these materials demonstrate good chemical resistance, good electrical properties and reduces tendency to tension fissuring. The formable masses comprise a binder material system based on epoxy resin and epoxy hardeners as well as fillers, an optionally, additional materials such as hardening accelerators, lubricants and coloring materials as well as other substances.

As hardening systems, the so-called latent hardeners can be introduced, which at room temperature should not cause any significant cross-linking reaction. The mixtures of epoxide resin and hardening material should be workable for a considerable period of time at temperatures up to about 50° C. and they should be storage stable for as long an extent as possible. On the other hand, at elevated temperatures the hardening reaction should take place as rapidly as possible and a useful preparation of the shaped parts should be obtainable with forming times of 0.5 to 5 minutes at 150° C.

Utilizing systems based on epoxide resins and quaternary ammonium salts, carboxylic acid anhydrides, dicyandiamide or aromatic amines as hardening materials, as well as with precross-linked epoxide resins, the achievement of storage stability at room temperature and sufficient hardening velocity at elevated temperature was not satisfactorily obtained.

It is known from U.S. Pat. No. 2,773,048 that it is possible to obtain a mixture of a solid epoxide resin and 4,4'-diamino-diphenylmethane as a hardening material for molding materials with good stability. The shaped bodies that are obtained from these formulations are observed to have a relatively long hardening time and possess the disadvantages of an insufficient heat stability and an insufficient leakage current resistance for electronic purposes.

These disadvantages are overcome according to the method described in German Pat. No. 1,061,067 wherein a moldable mass is prepared containing a liquid bisphenol digylcidyl ether and 4,4'-diaminodiarylalkanes which have a proportionally long shelf life at room temperature. According to that process, there is obtained a solid, yet meltable, soluble reaction product together through a moderate and precise charging of liquid diglycidylpolyether and 4,4'-diaminodiphenylalkane at longer time because of the curing process at temperatures under 100° C., preferably between 20° and 50° C., which can be ground together with fillers and, optionally, separation material and pigments to obtain a moldable mass having a longer storage stability at room temperatures with a higher conversion velocity at hardening temperatures which, in turn, lead to heat stable, moldable shaped articles that are resistant to leakage current. This method exhibits the considerable disadvantage that a precuring step of many hours at low temperature is necessary so that the obtaining of the moldable masses encounters difficulties in up to date euipped production plants, particularly because the precuring process requires very careful supervision so that the desired state of curing can be attained. A technical commerically satisfactory molding process is therefore not feasible because of these reasons.

An improvement in the ability of the process to be used for commerical purposes may be obtainable according to the method described in German Pat. No. 11 98 999 wherein an epoxy resin and diaminodiphenylalkane are dissolved in a ketone solvent material and is dried by heating at a temperature between 90° and 130° C. The ketones thereby bring about a delay in the poly addition reaction so that adducts can be prepared which have good storage ability. A disadvantage, however, resides in the process step which requires the dissolution of the reactants in a solvent material and the subsequent volatilization thereof.

In addition, adducts prepared from liquid epoxy resins with polyamines can be obtained according to German Pat. No. 22 30 653 wherein the binder material is composed of two different epoxy resin adduct types; adducts with epoxy and adducts with amino terminal groups. When considered from the standpoint of the increased expenditure because of the utilization of two different adduct types, the possibilities for resin hardening and correspondingly variability of the final product of this system is restricted.

It therefore became desirable to develop a mixture which was as technically feasible as possible, storage stable and heat resistant utilizing a binder material based on epoxy resins containing latent hardening agents which also possess the desirable properties of epoxy resins which are hardened or cross-linked by diaminodiarylalkanes but which are economically simple and which can be prepared without the above mentioned disadvantages.

The solution to this object is obtained according to the present invention by providing a mixture containing as the epoxy resin component having an adduct of a high molecular, solid epoxy resin having an average of more than 1 epoxy group in the molecule with 4,4'-diaminodiarylalkane, wherein the molecular ratio of 4,4'-diaminodimethylalkane to epoxy groups is 0.01–0.05 to 1.

When such adducts are ground and mixed with known latent hardening agents in quantities sufficient to bring about the hardening, then there will be obtained binder material mixtures which surprisingly possess an improved storage stability with simultaneous higher curing velocities at elevated temperatures, so that these mixtures can be suitably used for the preparation of formed bodies or sheet materials.

The adducts are prepared by reacting epoxy resin which is solid at room temperature and having on the average more than 1 epoxide group in the molecule with 4,4'-diaminodiphenylalkane in a molar ratio of 4,4'-diaminodiarylalkane to epoxy groups of 0.01–0.05 to 1, at temperatures in the range of 100° to 150° C.

As epoxy resins, there may be used resinous solid epoxidized cresol- or phenol-formaldehyde-novolac, solid substituted or unsubsituted bisphenol-A-glycidylether or also the cycloaliphatic epoxy resins or epoxy resin mixtures. These resis have an epoxy equivalent greater than 176 and a softening point of greater than 40° C.

As the 4,4'-diaminodiarylalkane, there is particularly to be mentioned 4,4'-diaminodiphenylmethane, 4,4'-diamino-diphenylethane, 4,4'-diaminodiphenyl-dimethylmethane or 4,4'-diamino-3,3'-dimethyldiphenylmethane. These are known materials and other suitable 4,4′-diaminodiarylalkanes can also be used. Generally, the alkane is a lower alkane (1–4 carbons) and the aryl is preferably phenyl or lower alkyl (1–4 carbons) substituted phenyl.

In contrast to the literature described adducts of epoxy resins and 4,4′-diaminodiarylalkane which contain 0.2 to 0.35 mol 4,4′-diaminodiarylalkane per epoxy equivalent, the epoxy resin adducts of the present invention are formed from a reaction product in which the 4,4′-diaminodiarylalkane is present in the amount of only 0.01 to 0.05 mol per epoxide equivalent of the resin. This relationship means that the adduct is not self-hardening but instead requires for its curing a further curing material. It is surprising that in spite of the utilization of further hardening materials, the hardened molding masses possess the same good mechanical, electrical and chemical properties as the known liquid epoxy resins that are hardened only with 4,4′-diaminodiarylalkane.

It is further surprising that also with such latent hardening agents which, when combined with pure epoxide resins yield mixtures of less storage stability, mixtures of good storage stability will be obtained when the adducts are utilized in accordance with the present invention instead of pure epoxy resins.

As additional suitable hardening materials, there may be used the known latent hardening materials from the group of acid anhydrides, polycarboxylic acids or the phenol formaldehyde condensation products. Other such additional hardening materials which are known in the art may also be used in accordance with the present invention.

Examples of polycarboxylic acids as curing agents are oxalic acid, phthalic, maleic-, aconitic acid or octacarbonyl phthalocyanine.

Examples of acid anhydrides are phthalic, trimellitic, succinic, citraconic, itaconic, maleic anhydride and adducts of maleic anhydride and unsaturated compounds.

Generally, all di- and polycarboxylic acids and anhydrides mentioned in K. Neville, *Handbook of Resins*, McGraw-Hill Book Company are suitable.

Particularly good properties and especially economical are the formable masses which contain the binder materials from the epoxy resin adducts of the present invention as well as the phenol resin such as novolac which are obtained in acid reaction conditions.

The mixture relationship of epoxy resin adduct to novolac are based on the hydroxy count (OH number) of the novolac and the epoxide number of the epoxy resin. Preferably, there is used equimolar ratios As a result of that, the weight ratios of the components according to molecular weight arrange between 1:4 to 4:1, preferably between 3:1 1 to 1:1. The reaction of each of the reaction components is carried out during a period of 40 to 120 minutes at a temperature in the range of 200° to 120° C., preferably for 60 minutes at 140° C.

The binder material mixture of epoxy resin adduct and curing agent can have subsequently added thereto limited amounts of accelerators. Although the addition of these accelerating agents is not absolutely necessary, they are however desirable to obtain the preferred shorter curing times in the actual carrying out of the invention. Such accelerating agents are known in the art and include, for example, amines such as dimethylamine, dimethylaminoethylphenol, metal halogenides such as borotrifluoride, zinc or zinc chloride, acetylacetonate or imidazole. Other accelerator materials which are known in the art may also be used for this purpose.

The preparation of the epoxy resin adducts is carried out by melting a solid epoxy resin and the 4,4′-diaminodiarylalkane and then mixing the liquid reactants at a temperature above 100° C. It is not important whether the materials are separately melted and then mixed together or whether they are previously mixed together as powder or granulate and then melted together and then intensively mixed together.

The reaction is completed within 5 to 10 minutes. After that the reaction mixture is cooled. The adducts have a softening point of greater than 50° C. They are ground at room temperature and then mixed with a latent curing agent and any desired filling and additional additives. The mixtures obtained thereby are storage stable at room temperature and are capable of crumbling and of being hardened through the heating within a short time to formed products or to individual sheets with good properties. They can therefore be used for the preparation of formed bodies or sheet materials. The products that are obtained in accordance from the mixtures of the present invention demonstrate a good aging resistance and weathering resistance. In particular, the electrical properties remain substantially unchanged even after long and extreme weathering.

The following examples serve to illustrate the invention but are not limited thereof in any way.

EXAMPLES

Mixtures made from binder materials based on epoxy resin and containing latent curing agents are prepared to include accelerators, fillers and additive substances according to the following basic receipe after grinding of the raw materials in a kneading machine.

|  | Parts by Weight |
| --- | --- |
| epoxy resin (adduct) | 20 |
| latent curing agent | 10 |
| accelerator (2-heptyldecylimidazole) | 0.1 |
| titanium dioxide | 35 |
| kaolin | 25 |
| fibrous material (broken glass fibers) | 6 |
| coloring material (carbon black) | 2.4 |
| separating material (zinc stearate) | 1.5 |

From the storage stable mixtures experimental bodies are prepared by molding for 60 minutes at 140° C. and which have the properties shown in the following table.

In carrying out the several examples and the comparative examples, the following binder material and curing agent are utilized:

EXAMPLE 1

Epoxy resin adduct: 275 kg of a commerical solid epoxy resin of a phenolic base with an epoxy equivalent of 220 and an softening point of 64 is heated to 135° C. and is melted at this temperature. With vigorous stirring, there is then introduced 4 kg of 4,4′-diaminodiphenylmethane over a periof of 10 minutes andthe rising temperature of the reaction system is then held to 145° C. with cooling. After conclusion of the reaction, an additional 4 kg of 4,4′-diaminodiphenylmethane is introduced over a period of 30 minutes and the reaction mixture is accordingly cooled so that the temperature does not rise over 150° C. Thereafter, the reaction mixture is permitted to stand for an additional 90 minutes at 140° C. and then the reaction product is permitted to cool. The obtained product is then ground to finely divided form. It has the following properties:
melt viscosity at 150° C.: 1400 mPa s
melting point (ring and ball): 90° C.
curing agent: a solid commercial acid condensed phenol-formaldehyde condensation novolac product with an average molecular weight of 580 and an hydroxy number of 540
Mixture relationship of the epoxy resin adduct to curing agent=2.5:1

EXAMPLE 2

Epoxy resin adduct: In the same manner as Example 1 there was utilized 275 kg of the epoxy resin of Example 1 with 3 kg 4,4'-diaminodiphenylethane and the product obtained thereby was then utilized.
curing agent: identical to Example 1
mixture ratio of epoxy resin adduct to curing agent: 2.5:1

EXAMPLE 3

The epoxy resin adduct was used in accordance with Example 1.
The curing agent was phthalic acid anhdride.
The mixture ratio of epoxy resin to curing agent was 1.8 to 1.

COMPARATIVE EXAMPLE 1

The binder system used was a liquid epoxy resin on the basis of bisphenol A with an epoxy equivalent of 188 and 4,4'-diaminophenylmethane as the curing agent.
The mixture ratio of resin to curing agent was 3.8:1.
The mixture obtained from the above mentioned receipe is required to be cured for 150 minutes at 180° C. in order to obtain a complete curing.

COMPARATIVE EXAMPLE 2

Epoxy resin the same as Comparative Example 1.
The curing agent the same as Example 1.
Mixture ratio of resin to curing agent was 1.8:1.

OBTAINED PROPERTIES

|  | Examples | | | Comparative Examples | |
| --- | --- | --- | --- | --- | --- |
|  | 1 | 2 | 3 | 1 | 2 |
| Flexure Strength (N/mm$^2$) | 55 | 53 | 68 | 56 | 42 |
| Impact Flexure Strength (KJ/m$^2$) | 4.1 | 4.2 | 3.5 | | |
| Impact Resistance Notch Bar Strength (KJ/m$^2$) | 2.2 | 2.1 | 2.5 | 2.1 | 1.5 |
| After Shrinkage (%) | 0.02 | 0.1 | 0.04 | 0.15 | 0.25 |
| Heat Dimensional Stability (°C.) | 155 | 147 | 125 | 105 | 67 |
| Dielectric Factor | 0.2 | 0.02 | 0.072 | 0.03 | 0.04 |
| Dielectric Constant | 4.3 | 4.3 | 4.4 | 5.0 | 4.3 |
| Surface Resistivity (Ω) | >10$^{10}$ | 10$^{11}$ | 10$^{11}$ | >10$^{10}$ | 10$^{11}$ |
| Specific Resistivity (Ω/cm) | 10$^{14-15}$ | 10$^{14-15}$ | 10$^{14-15}$ | 10$^{14-15}$ | 10$^{14-15}$ |
| Water Capacity (mg/100 g) | 15 | 20 | 25 | 25 | 60 |

Further variations and modifications of the invention described above will be apparent to those skilled in the art from reading of the foregoing and which are intended to be encompassed by the claims appended hereto.

The German priority document No. P 34 09 499.7 filed Mar. 15, 1984 is relied on and incorporated herein by reference.

We claim:

1. A storage stable heat curable mixture comprising a binder material of an epoxy resin and a latent curing agent wherein the epoxy resin component is an adduct formed of a high molecular weight solid epoxy resin having an average of more than one epoxy group per molecule and 4,4'-diaminodiarylalkane wherein the ratio of moles of the 4,4'-diaminodiarylalkane to epoxy equivalent ranges from 0.01–0.05 to 1.

2. The storage stable heat curable mixture according to claim 1, which further contains at least one filler.

3. The storage stable heat curable mixture according to claim 1, which further contains at least one additive selected from the group of fibrous substances, pigments and dyestuffs, lubricants, and separating agents.

4. The storage stable heat curable mixture according to claim 1, which comprises the adduct formed from a high molecular epoxy resin and 4,4'-diaminodiphenylmethane.

5. The storage stable heat curable mixture according to claim 1, wherein the curing agent is a phenol formaldehyde condensation product.

6. The storage stable heat curable mixture according to claim 1 which is prepared by reacting a solid epoxy resin having an average of more than one epoxy group in the molecule with diaminodiarylalkane at room temperature in a ratio of 0.01–0.05 moles of alkane to one epoxy equivalent in a temperature range of 100° to 150° C., and the adduct obtained thereby is then ground after cooling and then mixed with the latent curing agent.

7. The storage stable heat curable mixture according to claim 6, which further contains a filler added with the latent curing agent.

8. The storage stable heat curable mixture according to claim 1, which is subsequently shaped into a formed body.

9. A formed body made from the composition according to claim 1.

10. A sheet material made from the composition according to claim 1.

11. A method of forming a heat curable storage stable mixture comprising reacting an epoxy resin which is solid at room temperature and which contains an average of more than one epoxy group in the molecule with 4,4'-diaminodiphenylalkane in a ratio of 0.01–0.05 mols alkane to 1 equivalent of epoxy group at a temperature of 100° to 150° C., cooling the resulting adduct formed thereby, and grinding the adduct.

12. The method of forming a heat curable storage stable epoxy resin comprising adding a latent curing agent to a heat hardenable epoxy resin composition obtained by the method of claim 11.

13. The storage stable and heat curable mixture according to claim 1, wherein the diaminodiarylalkane is preferably a methane or ethane and the aryl group is preferably phenyl or lower alkyl (1 to 4 carbon) substituted phenyl.

14. The storage stable and heat curable mixture according to claim 1, wherein the epoxy resin has an epoxy equivalent of greater than 176 and a softening point of greater than 40° C.

15. The storage stable and heat curable mixture according to claim 1, wherein the latent curing agent is an acid anhydride, carboxylic acid or phenol-formaldehyde condensation product.

16. The storage stable and heat curable mixture according to claim 1, wherein the weight ratio of epoxy resin adduct to acid condensed phenolic resin (novolac) ranges from 1:4 to 4:1.

17. The storage stable and heat curable mixture according to claim 1, which further contains an accelerator.

18. The storage stable and heat curable mixture according to claim 17, wherein the accelerator is an amine, metal halogenide, acetonate or imidazole.

* * * * *